United States Patent [19]
Wiesemann et al.

[11] Patent Number: 5,911,349
[45] Date of Patent: Jun. 15, 1999

[54] ARRANGEMENT FOR BREAK-SEPARATING BEARING COVERS OF ALIGNED BEARING BORES IN BEARING DEVICE OF A MACHINE MEMBER

[75] Inventors: Johann Wiesemann; Clemens Luchner, both of München, Germany

[73] Assignee: Bayerische Motoren Werke Aktiengesellschaft, Munich, Germany

[21] Appl. No.: 08/564,216

[22] PCT Filed: Mar. 9, 1995

[86] PCT No.: PCT/EP95/00875

§ 371 Date: Jun. 6, 1996

§ 102(e) Date: Jun. 6, 1996

[87] PCT Pub. No.: WO95/28248

PCT Pub. Date: Oct. 26, 1995

[30] Foreign Application Priority Data

Apr. 16, 1994 [DE] Germany .............................. 44 13 255

[51] Int. Cl.6 .......................................................... B26F 3/00
[52] U.S. Cl. ............................. 225/103; 225/93; 225/97; 29/888.09
[58] Field of Search ................................ 225/93, 97, 103; 29/888.09

[56] References Cited

U.S. PATENT DOCUMENTS

| | | | |
|---|---|---|---|
| 3,884,406 | 5/1975 | Bowen | 225/103 |
| 4,684,267 | 8/1987 | Fetouh | 384/294 |
| 4,754,906 | 7/1988 | Brovold | 225/103 |
| 4,768,694 | 9/1988 | Fabris et al. | 225/103 |
| 5,263,622 | 11/1993 | Henzler et al. | 225/103 |
| 5,274,919 | 1/1994 | Becker . | |
| 5,503,317 | 4/1996 | Jones et al. | 225/103 |
| 5,568,891 | 10/1996 | Hoag et al. | 225/93 |

FOREIGN PATENT DOCUMENTS

| | | |
|---|---|---|
| 0 167 320 | 1/1986 | European Pat. Off. . |
| WO88/06942 | 9/1988 | WIPO . |

OTHER PUBLICATIONS

International Search Report, Jul. 6, 1995, World–International.

Primary Examiner—M. Rachuba
Assistant Examiner—Sean Pryor
Attorney, Agent, or Firm—Evenson, McKeown, Edwards & Lenahan, P.L.L.C.

[57] ABSTRACT

For a device for fracture separating bearing covers of aligned bearing bores in bearing arrangements of a machine member, which comprises a guided separating element which is profiled in an approximately semicircular shape and acts in the center onto a bearing cover in the bearing bore, for obtaining a device which is structurally simple, it is suggested that, for the fracture separating, a half-mandrel or full mandrel, which can be axially arranged in one or several bearing bores, is provided. An operating linkage, which only causes the guiding of the respective mandrel in the fracture separating direction, is applied to the respective mandrel transversely to its longitudinal course, the respective mandrel being held in a rotationally secured manner and each bearing cover being rotationally secured while being clamped against the respective mandrel.

16 Claims, 7 Drawing Sheets

ARRANGEMENT FOR BREAK-SEPARATING BEARING COVERS OF ALIGNED BEARING BORES IN BEARING DEVICE OF A MACHINE MEMBER

BACKGROUND AND SUMMARY OF THE INVENTION

This invention is based on the preamble of claim 1 of U.S. Patent Document U.S. Pat. No. 4,684,267.

This known device, which can be used for several bearing arrangements of a crankcase of a piston engine, serves the purpose of a step-by-step fracture separating of the bearing covers which are cast in one piece with the crankcase. For this purpose, this known fracture separating device comprises a cylindrical supporting body which can be introduced into the bearing bore of several bearing arrangements and has transversely directed cuts provided in the spacing of the bearing arrangements with respect to the respective guided arrangement of a separating element designed approximately in the shape of half a disk. Recesses in the supporting body and the separating elements, which are provided in the center in the longitudinal course, are used for receiving an operating rod for the separating elements. The operating rod, which is operatively connected with an energy accumulator, has wedge surfaces assigned to the separating elements for the radial displacement of the separating elements in the bearing bores for generating fracture separating forces.

This known device, which comprises a guidance of each separating element which is separate from the operating rod, has the disadvantage of a proportion of frictional force which is high relative to the sum of all fracture separating forces and which, in addition to the energy accumulator with correspondingly large dimensions, also results in high expenditures with respect to energy. The frictional forces in the known device, which are in effect on the wedge surface pairs of the operating rod and the separating elements, also result in a wear of a varying distribution which acts against an advantageous, virtually one-step breaking operation in the case of each bearing cover. On the contrary, this results in a time-staggered breaking of the bearing covers with resulting fracture separating surfaces of varying qualities because, for later-breaking bearing covers, the unchanged total fracture separating force is distributed to a few residual bearing covers. Furthermore, in the case of this known fracture separating process, the bearing covers are first fracture-separated from the crankcase on one side, specifically in an uncontrolled manner, and, for the fracture separating, for avoiding a bending breakage, the fracture-separated side of each bearing cover is rotationally secured by high-expenditure additional measures, for example, by means of screws.

A device for fracture-separating bearing covers with a relatively favorable ratio of the proportion of the frictional force of the device to the fracture separating force to be applied is known from European Patent Document EP-B 0 396 797. In the case of this device used for the fracture separating of connecting-rod bearing covers, the operating linkage is a falling impact mass for affecting a guided carriage on which a half-mandrel is arranged which penetrates the bearing covers of the rotationally secured connecting rod and is fixedly connected with the carriage on both ends. In this case, the guided carriage is used for guiding the half-mandrel affecting the bearing cover for the purpose of fracture separating.

In the case of this device with a guidance of the fracture-separating-effective half-mandrel, it is also a disadvantage that the impact mass acting as the operating linkage springs back because of the material elasticities when impacting on the pushed carriage used for guiding the half-mandrel, and therefore, during the fracture separating operation, the impact mass and the carriage do not constantly act in the same direction. In a disadvantageous manner, fracture surfaces of formed cracks may strike on one another in a swinging manner and cause a breaking-out of materials.

Finally, another device is known from U.S. Patent Document U.S. Pat. No. 4,754,906 which is used for the fracture separating of a connecting rod bearing cover and has a guidance for a fracture-separating-effective half-mandrel which is separate from the operating linkage. This half-mandrel, which is arranged in a relatively movable manner in a stand, is acted upon hydraulically. It comprises a chamber for a hydraulic operating linkage in which a piston-type extension, which is supported against a half-mandrel fixedly arranged on the stand, engages as a support of a sealing device.

The relatively massive, fracture-separating-effective half-mandrel is guided on the stand side by way of guiding surfaces spaced away from the piston-type chamber extension or from the plane of the introduction of the fracture separating force. Particularly as the wear of the guiding surfaces increases, this arrangement seems critical because, during the force-controlled impacting of the half-mandrel against the bearing bore of a connecting rod bearing arrangement, an oblique positioning cannot be excluded with results in additional friction. However, an oblique positioning has a disadvantageous effect on the fracture separating.

It is an object of the invention to design a device for fracture separating such that a relatively low proportion of friction force remains low for a long usage time of the device as a result of a simpler structure of the device and such that the device structure permits a desired massive construction of the device, while the space requirements are relatively low, for a force which can be abruptly set free from a respective energy accumulator and which, acting as an active force directly on the bearing cover to be separated, is intended for a perfect one-step fracture separating of a bearing cover which is held in a rotationally secured manner by means of the device.

This object is achieved by means of claim 1, the inventive design of the device for fracture separating being characterized in that, for the fracture separating, a half-mandrel or full mandrel which can be axially arranged in one or several bearing bores is provided, and in that an operating linkage, which exclusively causes the guiding of the respective mandrel in the fracture separating direction, is applied to the respective mandrel transversely to its longitudinal course, in which case the corresponding mandrel is held in a rotationally secured manner and each bearing cover is rotationally secured while being clamped against the respective mandrel.

The inventive combination of the characterizing features advantageously results in a simpler structure of the device, in which case, in comparison to the prior art, the simpler structure, in a manner which is significant with respect to the invention, is achieved by means of a combined operating/guiding linkage which is applied to the respective mandrel transversely with respect to its longitudinal course in the fracture separating direction. By means of the integration according to the invention of the mandrel guidance required for a perfect fracture separating with the operating linkage, the number of guiding surfaces subjected to friction is considerably reduced. The advantage is a frictional force proportion to be generated by the energy accumulator which is lower relative to the fracture separating force. This has the additional advantage of a smaller-size energy accumulator and, because of the lower friction loss for an abrupt introduction of force, advantageously results in an almost vertical course of the rise of force in the case of a corresponding selection of an energy accumulator.

By means of the selection of an energy accumulator in the preferred construction of a piston cylinder-unit with a piston rod which forms a section of the operating linkage, in a further advantageous manner, a simple construction of the structure of the invention is achieved in that the piston rod which is guided in a straight manner on the cylinder side is used for the straight guiding of the respective mandrel in the fracture separating direction. This fracture separating device which, in comparison to the prior art, according to the invention, has a minimum of guiding surfaces with respect to its structure, irrespective of the number of the bearing covers to be fracture-separated, in addition to having a simple construction, it can be designed to be advantageously massive for a one-step fracture separating.

A particularly massively constructed operating linkage can advantageously be used for the rotationally securing arrangement of the respective fracture separating mandrel. In a further advantageous manner, the massively designed operating linkage permits the arrangement of a clamping device for a bearing cover which is operated in a controlled manner, in which case the clamping device is brought to rest against the assigned bearing cover before the fracture separating in such a manner that the bearing cover is clamped in a rotationally secured manner between the clamping device and the respective fracture separating mandrel during and after the fracture separating in order to avoid a bending fracture in a last-breaking separating area.

The combined operating/guiding linkage which is guided in a straight manner and has a fracture separating mandrel which is rotationally secured relative to the operating/guiding linkage and has bearing covers which can be clamped in a rotationally secured manner relative to the fracture separating mandrel, is therefore advantageously distinguished by the avoidance of influences which, in the operation of the device may be disadvantageous for the one-step fracture separating (oblique positioning, large plays, elasticities of materials).

In addition to the preferred piston-cylinder unit, falling weights are conceivable as energy accumulators for triggering the fracture in the case of a corresponding prestressing force, and furthermore, a modified operating linkage with a kinematically separately caused straight guidance of its connection point with the respective fracture separating mandrel is also conceivable.

For a fracture separating device, which is massively structured while its construction is compact, a hydraulic piston-cylinder unit is preferred as an energy accumulator by means of which a desirably high prestressing force and, by means of a hydraulic intensification, a fracture separating force which can be set free abruptly can by implemented.

Advantageous embodiments of the invention are described in additional subclaims. In particular, these describe fracture separating mandrels which are designed with a view to different possibilities of introducing the reaction force, which is diametrical to the fracture separating force, into the respective machine member, and fracture separating devices which by means of these mandrels are in each case adapted with respect to the construction and the arrangement. Additional subclaims relate to applications of the fracture separating devices according to the invention with respect to the number and arrangement of several bearing covers to be separated, also with respect to relative arrangements of fracture separating surfaces of a bearing cover and finally with respect to the handling of fracture-separated bearing covers of one or several machine members.

Other objects, advantages and novel features of the present invention will become apparent from the following detailed description of the invention when considered in conjunction with the accompanying drawings.

DETAILED DESCRIPTION OF THE DRAWINGS

Figure 1:
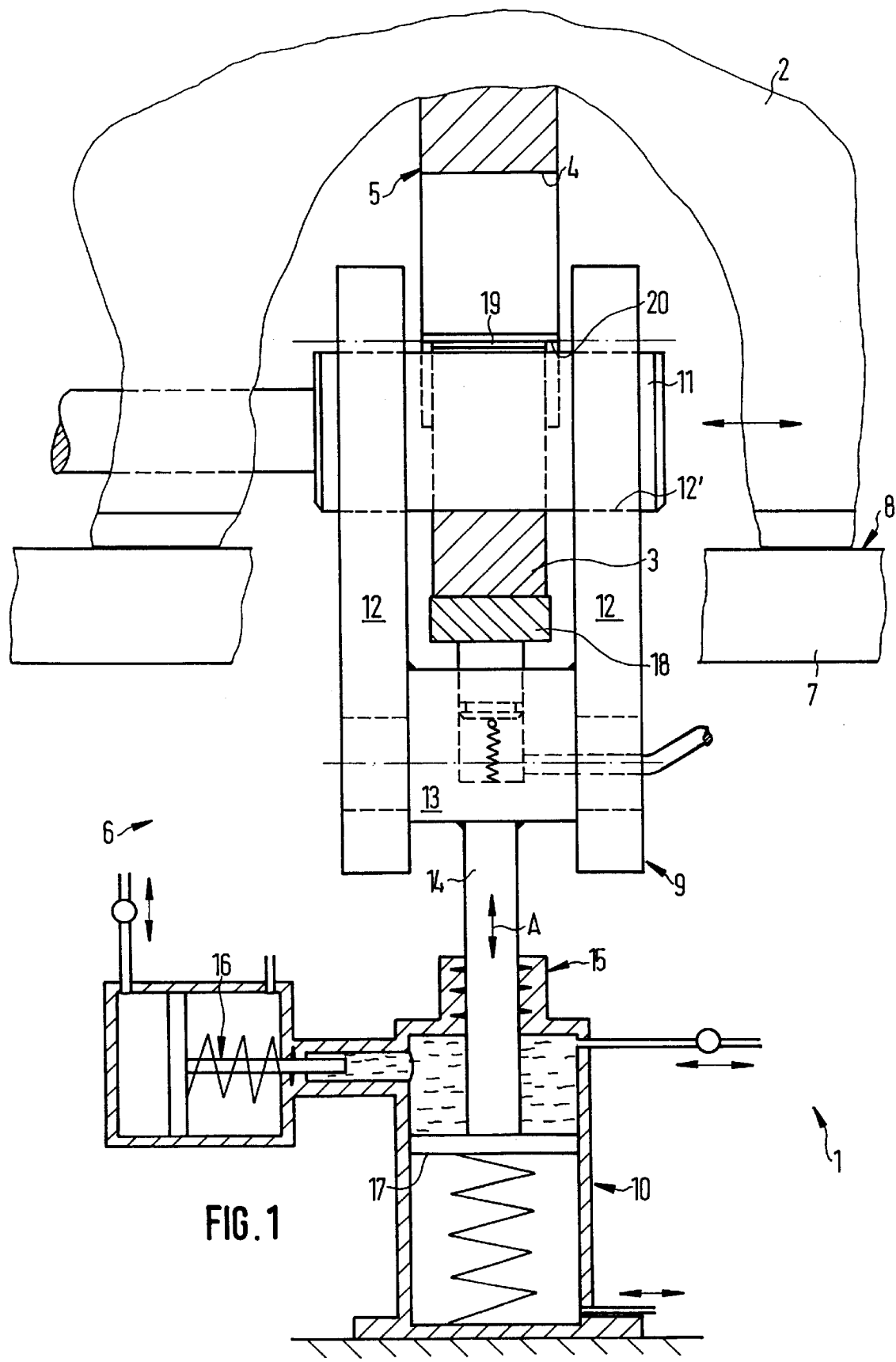
FIG. 1 is a view of a schematic part sectional basic construction of a fracture separating device according to a first preferred embodiment of the invention for fracture separating a bearing cover of a crankshaft bearing, which is cast integrally with a crankcase, by means of a half-mandrel.

A device 1 is shown in FIG. 1 for fracture separating a bearing cover 3 of aligned bearing bores 4 in bearing arrangements 5, which bearing cover 3 is integrally cast with a crankcase 2. Device 1 is structurally formed of a fracture separating device 6 and a stand 7, which is not shown in detail and has a receiving device 8 for a crankcase 2. The fracture separating device 6 comprises a combined operating/guiding linkage 9 which is in an operative connection with an energy accumulator designed as a hydraulic piston-cylinder unit 10, for causing a predetermined prestressing force as well as the fracture separating force on the bearing cover 3.

For fracture separating the bearing cover 3 from the crankcase 2, the combined operating/guiding linkage 9 interacts with a half-mandrel 11 which can be axially arranged on the bearing cover side in the bearing bore 4. The half-mandrel 11, which is axially introduced into the bearing bore preferably in a mechanical manner, is connected with lugs 12 positioned on both sides of the bearing arrangement, which lugs are connected with a piston rod 14 of the piston-cylinder unit 10 by way of an intermediate piece 13. The lugs 12 have openings 12' which correspond to the cross-section of the half-mandrel 11 and are adapted with a slight play and which therefore, at the same time, have the purpose of rotationally securing the half-mandrel 11 relative to the direction of the fracture separating force according to the arrow "A".

According to the invention, the linkage 9, which by way of the lugs 12 is applied to the half-mandrel 11 transversely to its longitudinal course, is also used for guiding the half-mandrel 11 used for the fracture separating in the fracture separating direction according to arrow "A". The straight-guidance of the half-mandrel 11 in the fracture separating direction, which is advantageous for a more or less one-step fracture separating of the bearing cover 3, is achieved in a simple manner by means of a cylinder-side guide 15 of the piston rod 14 in the piston-cylinder unit 10. The operating/guiding linkage 9 combined according to the invention, while taking into account the slight displacement of the half-mandrel 11 customary during fracture separating, therefore results in a fracture separating device 6 with a frictional force proportion which is advantageously low in comparison to the fracture separating force. The thus achieved favorable efficiency permits the use of a small-size energy accumulator, such as the preferably hydraulic piston-cylinder unit 10.

While the construction of the fracture separating device 6 is advantageously compact, the operating/guiding linkage 9 according to the invention also permits a massive further development of the linkage 9 with massive lugs 12 for avoiding elasticities of material which may have an advantageous effect on the one-step fracture separating operation.

With the most extensive elimination of elasticities of material, a tension-resistant operating/guiding linkage 9 is obtained which permits a prestressing force from the hydraulic piston-cylinder unit 10 which is aimed at the quality of the machine member to be broken and which is by 10 to 30% lower than the fracture separating force. A slight difference between the prestressing force and the fracture separating force is advantageous for a one-step fracture separating of the bearing cover 3. In the case of a hydraulically intensified force acting upon the piston 17 of the energy accumulator 10 initiated advantageously rapidly by means of a stepped piston 16, a slight difference between the two forces results in a very steeply rising course of the fracture separating force for the desired one-step fracture separating of the bearing cover 3 from the crankcase 2.

Another important aspect for achieving a one-step fracture separating of the bearing cover 3 is its rotational securing during the fracture separating operation. Since, even if the fracture separating force is introduced into the bearing cover 3 exactly in the center, a uniform breaking in both separating areas of the bearing cover 3 and the crankcase 2 is improbable because of inhomogeneities of the crankcase material, after a fracture in one of the separating areas, during the further separating operation, a rotation of the bearing cover 3 will occur about the other separating area which has not been separated. In order to avoid this rotation, which is damaging to the quality of the fracture separating surfaces of a separating area, the bearing cover 3 is rotationally secured by means of a stop 18 which is preferably hydraulically operative in a controlled manner and may be locked (not shown).

The operating/guiding linkage 9 combined according to the invention advantageously permits the integral arrangement of the hydraulic stop 18 in the linkage 9, whereby a clamping holding of the bearing cover 3 on the half-mandrel 11 is ensured during the fracture separating operation and beyond. This integral arrangement of the stop 18 arranged in a guided manner in the intermediate piece 13 fixedly connected with the lugs 12 permits, in an inventive combination with the half-mandrel 11 rotationally secured by way of the openings 12', relative to the lugs 12, a clamping holding of the bearing cover 3 with an action/reaction effect achieved in a massive section of the linkage 9 which advantageously has no influence on the guidance 15 of the piston rod 14 of the linkage 9.

For a targeted initiation of the fracture, the bearing bore 3 is preferably constructed with known fracture separating notches 19. These will be sufficient for a fracture separating of the bearing cover 3 by means of the device 1 with fracture separating surfaces arranged on both sides of the bearing bore 4 in a plane. In the case of fracture separating surfaces according to application P 44 13 255, on which the priority is based, which are arranged in a sloped manner with respect to one another, steps 20, which also influence the fracture breaking direction, are assigned to the fracture separating notches 19. In this case, the design of the half-mandrel 11 is important whose curvature radius in the area of the support in the bearing bore 4, as a function of the respective angle α (not shown) between the mutually sloped fracture separating surfaces of a bearing cover 3, is selected to be 0.5% to 5% smaller than the constant curvature radius of the bearing bore 4.

For the assignment to the respective bearing arrangement 4, which is required after the fracture separating for each bearing cover 3, each bearing cover 3 is held loosely on the crankcase 2 by means of screw bolts which are not shown. In the case of mutually sloped fracture separating surfaces with fastening screws which each extend approximately vertically thereto, during the fracture separating, such a bearing cover 3 is held loosely on the crankcase 2 by means of special screw bolts which have tapered shafts. These shaft taperings, in combination with the screw bolt passage bores (not shown) in the respective bearing cover 3, have the result that this bearing cover 3 can be displaced to a sufficient extent in the fracture separating direction during the fracture separating.

The devices for fracture separating illustrated in the other figures are based in principle on the device 1 of FIG. 1 but are further developed for the simultaneous fracture separating of several bearing covers of a crankcase, preferably for the fracture separating of a bearing cover compound frame in which the bearing covers are fixedly connected with one another.

Figure 2:
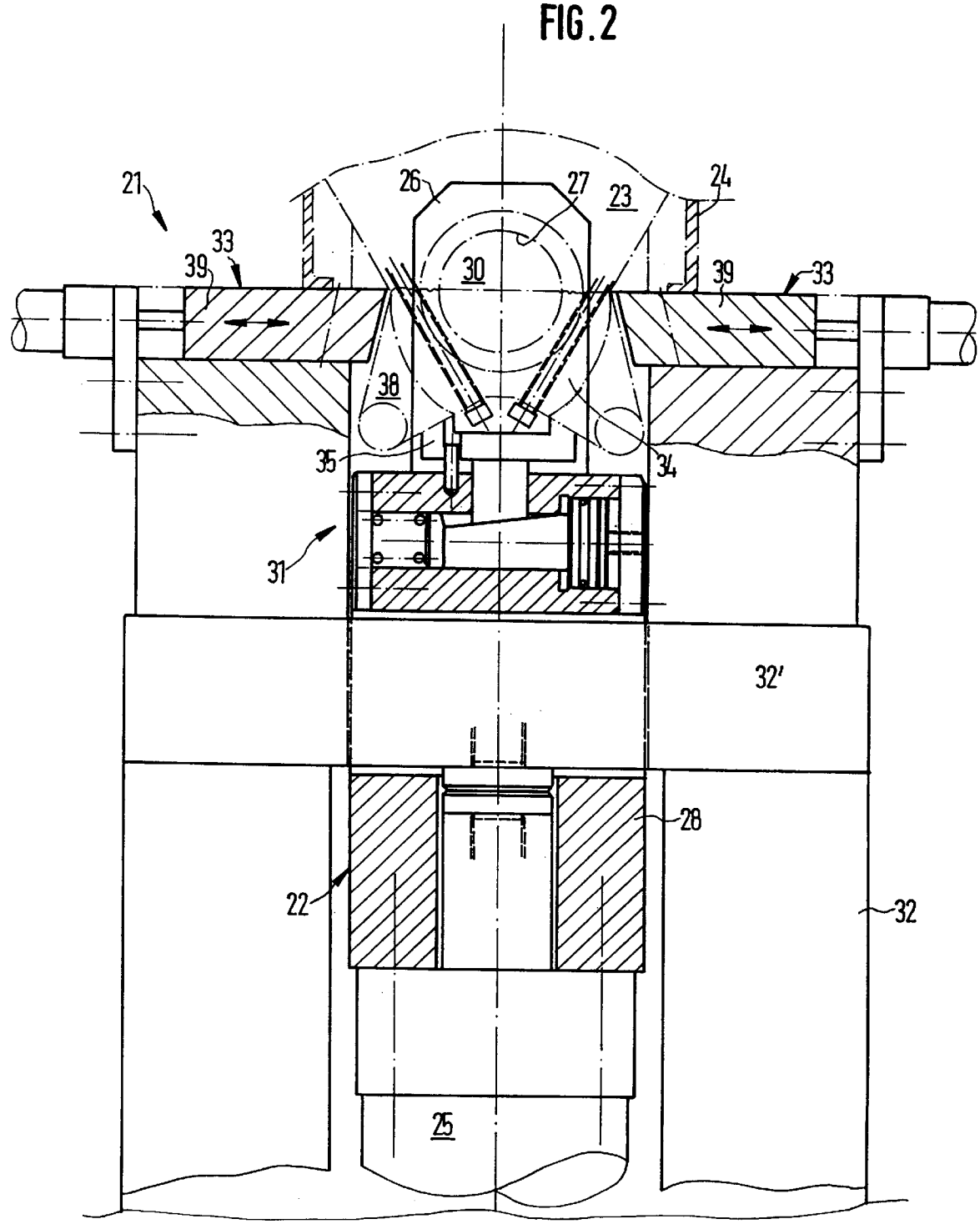
FIG. 2 is a schematic part section view of a fracture separating device for the common fracture separating of several crankshaft bearing covers of a crankcase by means of a massive full mandrel, constructed according to a second preferred embodiment of the invention.
Figure 3:
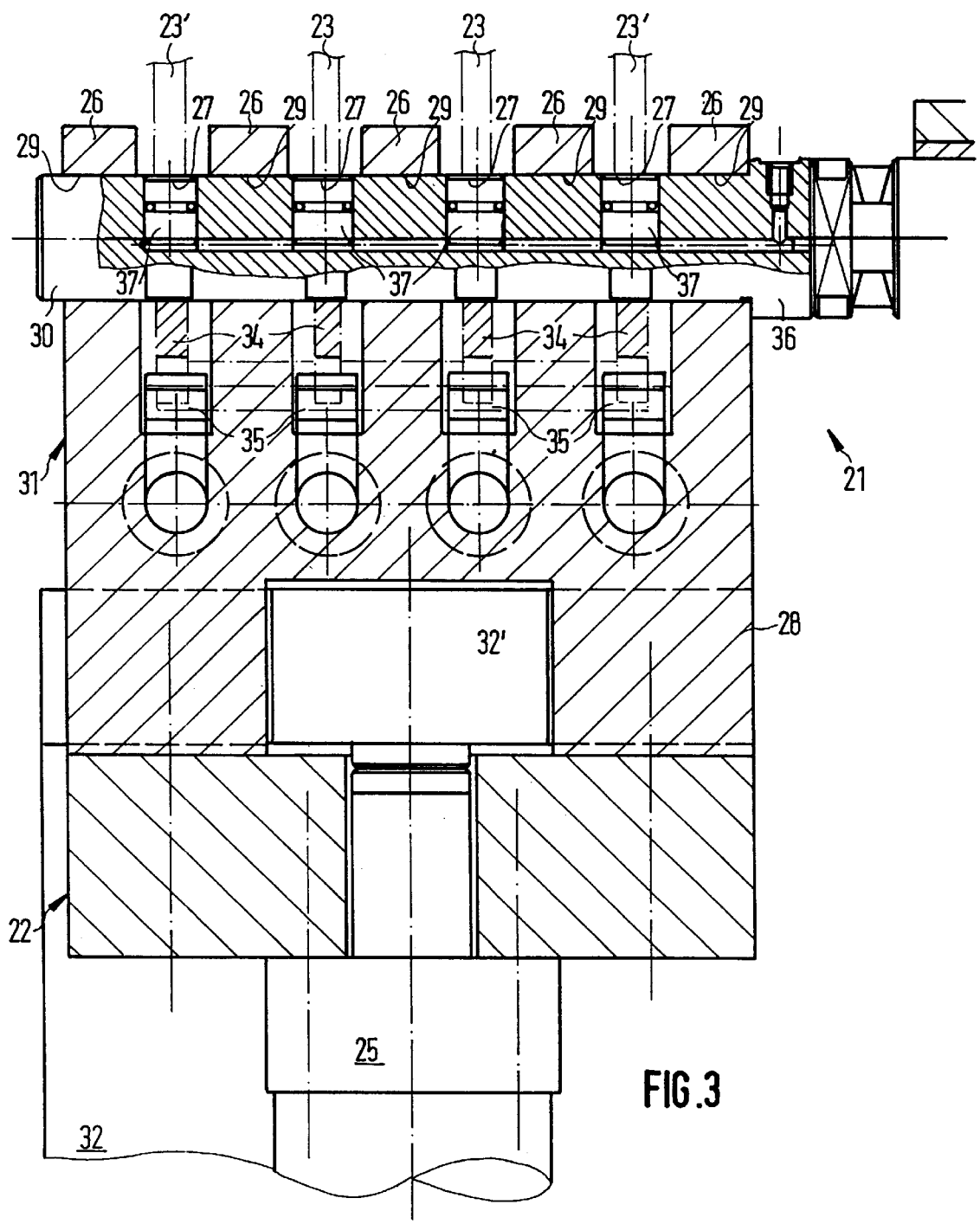
FIG. 3 is a schematic part sectional view of the FIG. 2 embodiment taken along a plane perpendicular to the plane of the FIG. 2 illustration.

In the case of the device 21 illustrated in FIGS. 2 and 3, the combined operating/guiding linkage 22 comprises one lug 26 respectively between adjacent bearing arrangements 23 of a crankcase 24, which lug 26 is operatively connected with the piston-cylinder unit 25. These lugs 26, which are connected with the piston-cylinder unit 25 by way of a common tension bar 28, have openings 29, which can in each case be aligned with the bearing bores 27 of the bearing arrangements 23, for the guided receiving of a full mandrel 30 which can be introduced in the axial direction of the bearing bores 27. Further, the fracture separating device 31, which is essentially formed of the combined operating/guiding linkage 22 and the piston-cylinder unit 25 (energy accumulator), is arranged in a stand 32 which has a receiving device 33 for the positioned arrangement of the crankcase 24 relative to the fracture separating device 31.

As illustrated particularly in FIG. 3, the fracture separating device 31 has lugs 26 between the bearing arrangements 23 as well as outside the end bearing arrangements 23', which lugs are stressed with respect to tension for prestressing and for the fracture separating force and which, being jointly operated by the piston-cylinder unit 25 supported on a stand bar 32', act by way of the full mandrel 30 onto the fracture-separable bearing covers 34. For the rotationally secure holding of the bearing covers 34, stops 35 are provided on the lugs which can be applied in a controlled manner to the bearing covers 34. FIG. 3 also shows that the full mandrel 30 strikes by means of an impact collar 36 axially against an outer lug 26 and that the full mandrel 30 is axially secured in its position in a clamped manner by means of hydraulic pistons 37 impacting in the bearing bores 27 of the bearing arrangements 23.

Finally, the full mandrel 30, which, for example, can be delivered mechanically, for achieving a fracture separating of predetermined bearing covers 34 which is different with respect to time, may have, in its bearing-cover-side circumferential area, profiles which, in particular, are offset in a radially eccentric manner, by way of which profiles bearing covers 34 which are assigned to same are broken somewhat later.

As illustrated in FIG. 2, the fracture separating force in the case of the device 21, which is caused as a tension force by way of the fracture separating device 31, is supported by way of the receiving device 33 of the stand 32. It is also shown that the bearing covers 34 are combined to form a bearing cover compound frame 38. In order to facilitate the positioning of the crankcase 24 relative to the fracture separating device 31, the stand 32 is equipped with supporting receiving devices 39 for the crankcase 24 which are arranged so that they can be moved transversely with respect to the fracture separating direction.

Figure 4:
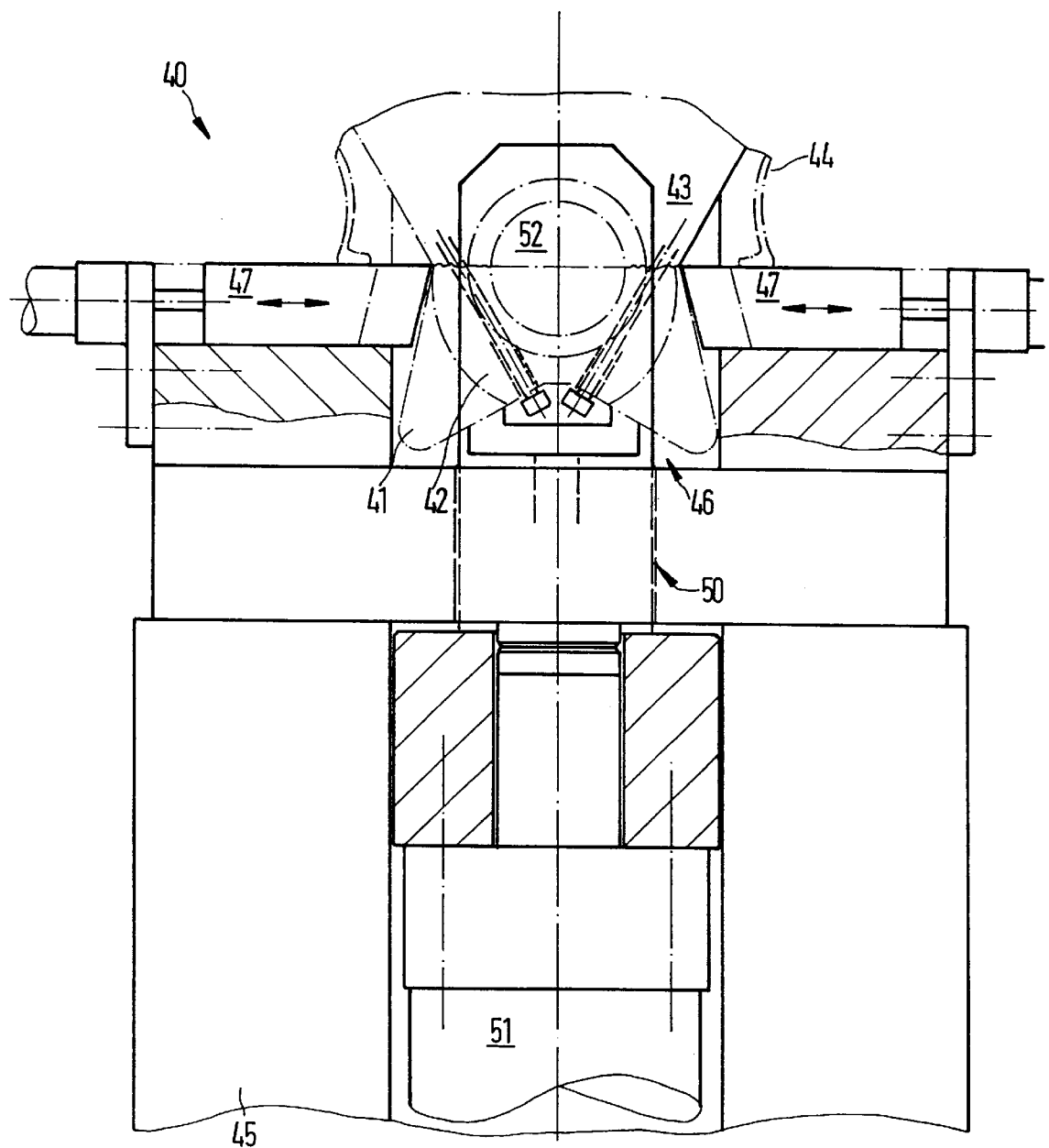
FIG. 4 is a schematic part sectional view of a device for the common fracture separating of several crankshaft bearing covers by means of a full mandrel constructed of sections which can be radially moved with respect to one another constructed according to a third preferred embodiment of the invention.
Figure 5:
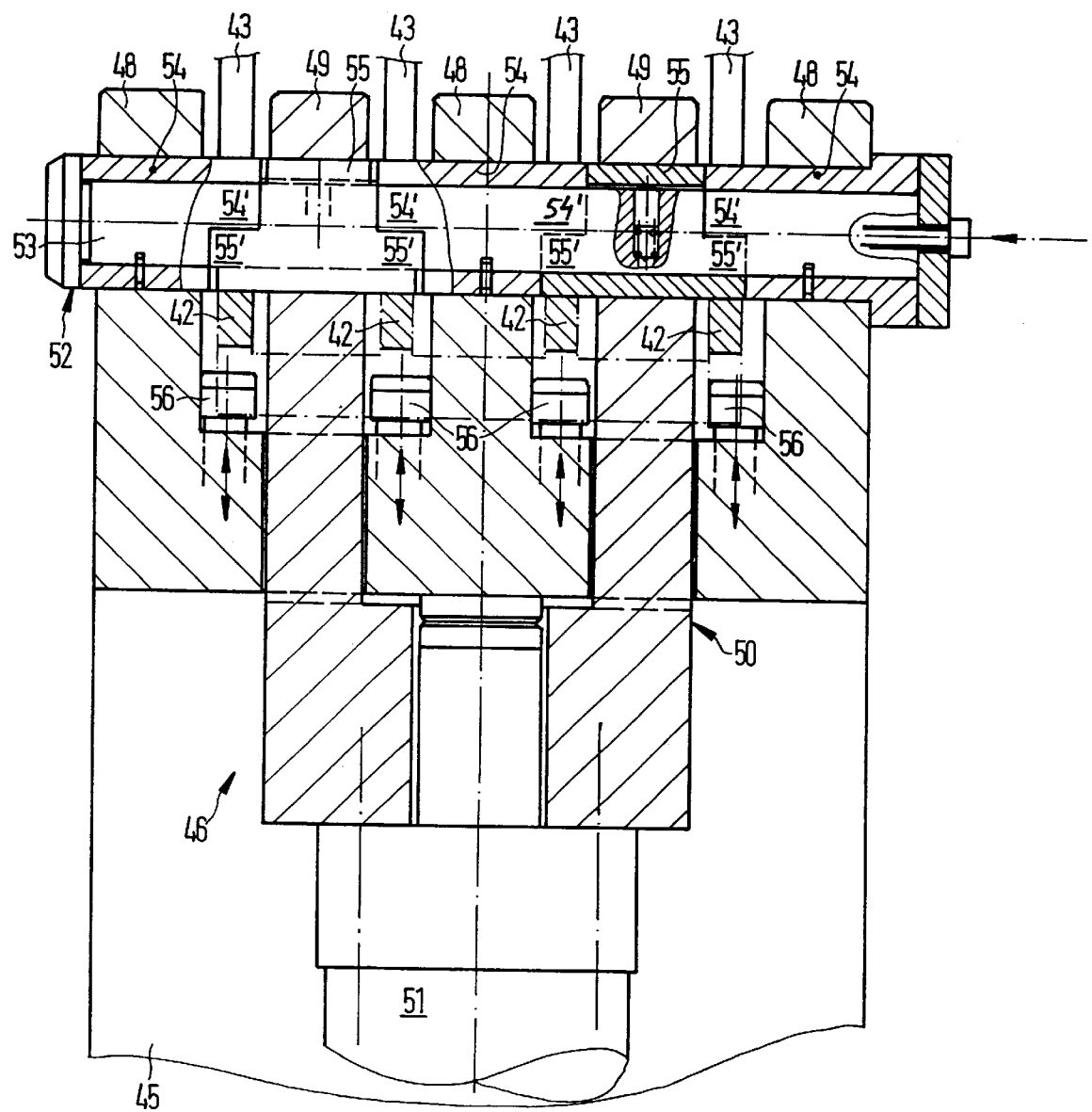
FIG. 5 is a schematic part sectional view of the FIG. 4 embodiment taken along a plane perpendicular to the plane of the FIG. 4 illustration.

A device 40 which is illustrated in FIGS. 4 and 5 is also used for fracture separating several bearing covers 42 for bearing arrangements 43 of a crankcase 44 arranged in a bearing cover compound frame 41. With respect to its structure, the device 40 comprises a stand 45 and a fracture separating device 46. Relative to the fracture separating device 46 causing the fracture separating by tension, the crankcase 44 is positioned on supporting receiving devices 47 of the stand 45 which can be moved transversely. Deviating from the device 21 of FIGS. 2 and 3, in the case of the device 40, the fracture separating force is introduced into the crankcase 44 not from the outside but, by way of supporting lugs 48 fixed to the stand, directly into the bearing bores of the bearing arrangements 43 of the crankcase 44.

Relative to the bearing arrangements 43 of the crankcase 44, the supporting lugs 48 are arranged such that one tension lug of the combined operating/guiding linkage 50 is arranged between two supporting lugs 48 respectively. The lugs 49 are jointly operated by a piston-cylinder unit 51 of the fracture separating device 46. By means of the different type of support of the fracture separating force, a built-up full mandrel 52 is obtained for the fracture separating device 46.

The built-up full mandrel 52 comprises a carrying mandrel 53 on which supporting sleeves 54 are arranged which are alternately centered in the supporting lugs 48 as well as fracture separating sleeves 55 which are centered in the tension lugs 49. The fracture separating sleeves 55 are arranged to be movable in the fracture separating direction relative to the carrying mandrel 53 and, by means of axially extending, semicircular-type extensions 55', engage in adjacent bearing arrangements 43 for acting upon bearing covers 42 which can be fracture separated. The supporting sleeves 54 which are centered in the supporting lugs 48 have axially extending semicircular-type projections 54' by means of which the reaction force, which is diametrical with respect to the fracture separating force, is introduced into the respective bearing bore of a bearing arrangement 43 in a circumferential area which is diametrical with respect to the bearing cover 42 which can be fracture-separated. Thus, the fracture separating forces are supported in the bearing bores of the bearing arrangements 43 and are thus kept away from other parts of the crankcase 44.

The full mandrel 52, which is built-up to essentially fill out by means of an expediently selected play the respective bore cross-sections in the lugs 48 and 49 as well as in the bearing arrangements 43 by means of its fracture separating sleeves 55 and supporting sleeves 54, is arranged in a rotationally secured manner on one of the supporting lugs 48 in which case, for the precise alignment of the fracture separating sleeves 55 in the fracture separating direction, the supporting sleeves 54 are non-rotatably connected with the carrying mandrel 53 of the full mandrel 52. As also shown in FIG. 5, the supporting sleeves 55 are guided in sections on the front side between the supporting sleeves 54 which are non-rotatably arranged on the carrying mandrel, in which case this guidance is also promoted by the fact that each fracture separating sleeve 55 is operated by way of a tension lug which acts on an axially relatively wide basis.

In addition, the device 40 is equipped, on the massive tension lugs 49 of the combined operating/guiding linkage 50, with rotationally securing stops 56 (schematically illustrated) which can be applied in a controlled manner.

Figure 6:
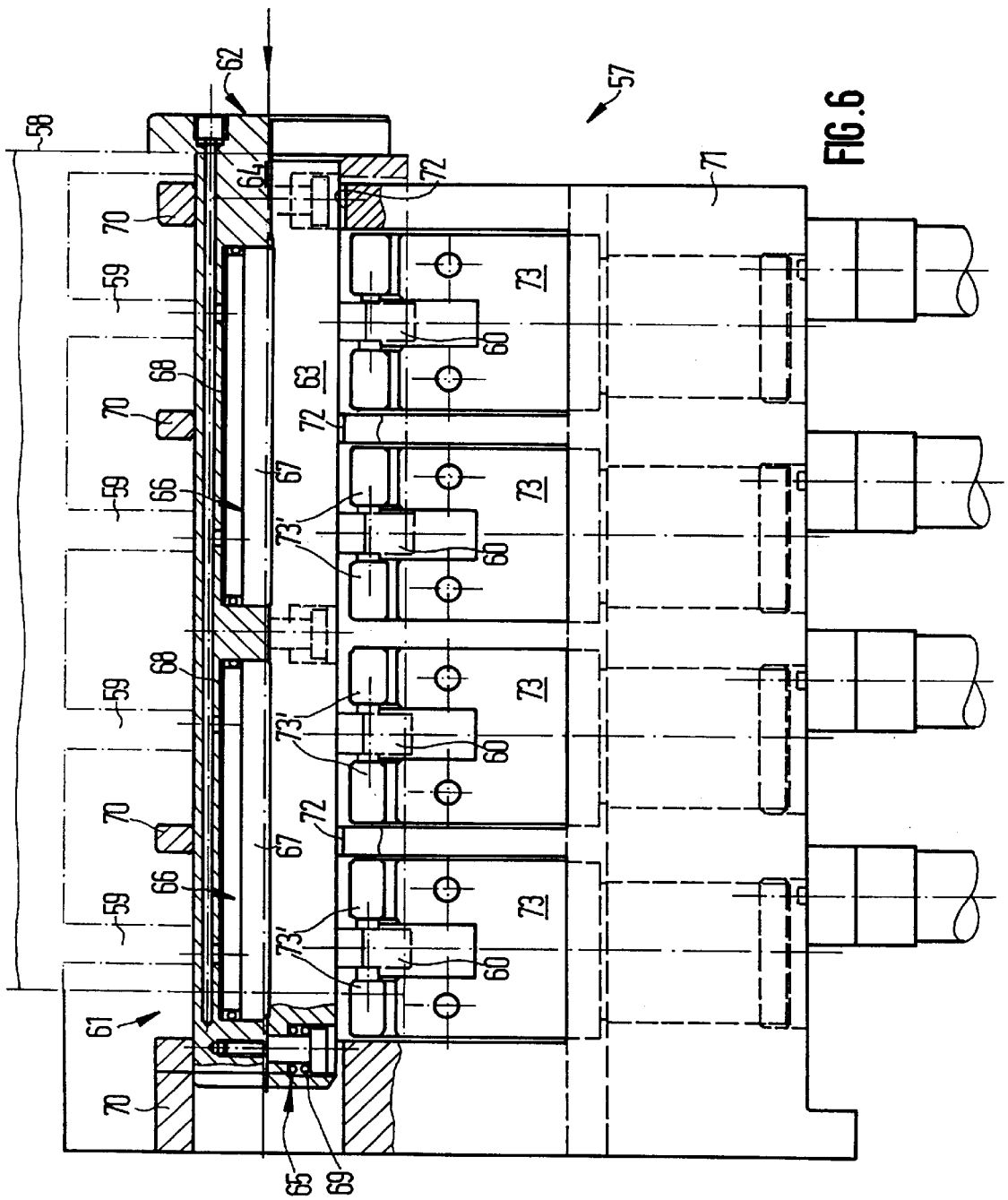
FIG. 6 is a schematic part sectional view of a fracture separating device for the common fracture separating of several crankshaft bearing covers by means of a full mandrel constructed of hydraulically expandable halves, constructed according to a fourth preferred embodiment of the invention.
Figure 7:
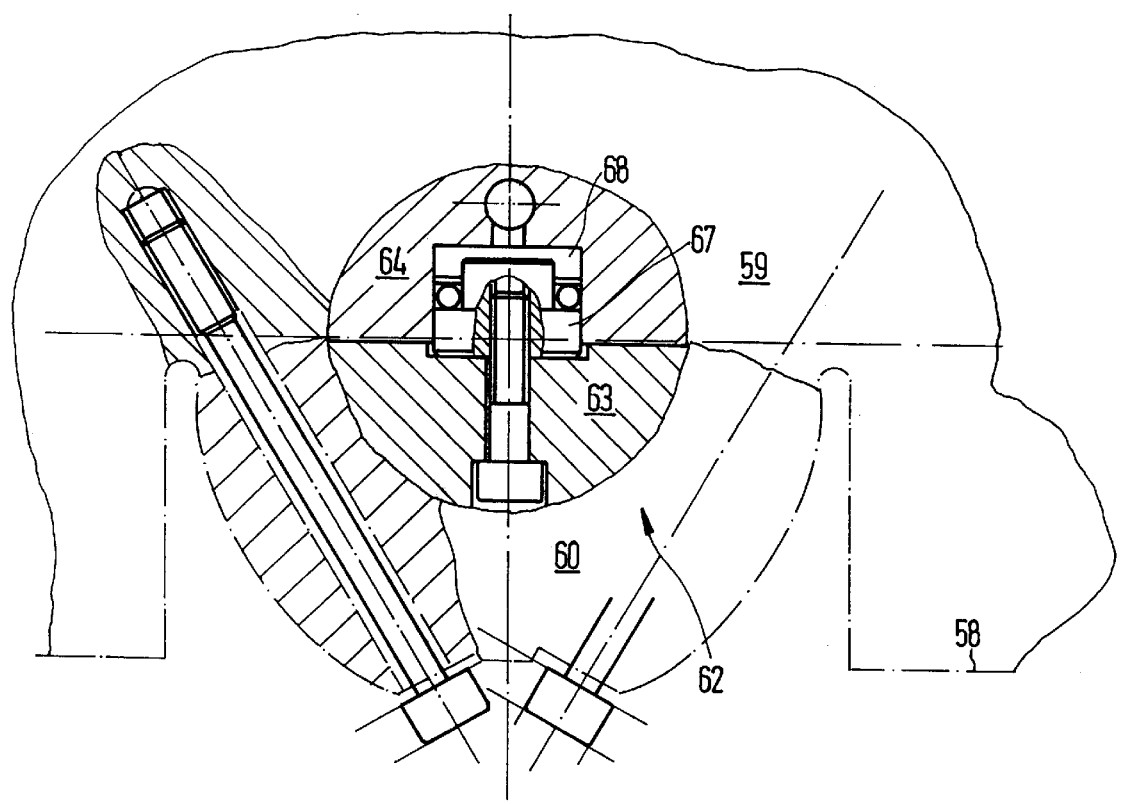
FIG. 7 is a schematic part sectional view of the FIG. 6 embodiment taken along a plane perpendicular to the plane of the FIG. 6 illustration.

A device 57, which is illustrated in FIGS. 6 and 7, comprises with respect to its structure also a stand (not shown) for the positioning of a crankcase 58 with integral bearing arrangements 59 whose bearing covers 60 are separated by means of a fracture separating device 61. The fracture separating device 61 comprises an expanding mandrel 62 which can be axially introduced through all bearing bores of the bearing arrangements 59 and which is formed of two half-mandrels 63, 64. In this case, the bearing-cover-side half-mandrel 63 is used for the fracture separating of the bearing covers 60, which half-mandrel 63 is supported with respect to the housing-side half-mandrel 64 against the resistance of an elastically flexible stop 65 by way of hydraulic pistons 67 used as a combined operating/guiding linkage 66.

For achieving an operating/guiding linkage 66 of a simple construction, the hydraulic pistons 67 are made of commercially available clamping strips which are arranged to be guided in oblong-hole-type chambers 68 of the case-side or the supporting-side half-mandrel 64. So that, for a perfect fracture separating of the bearing covers 60, when pressure is admitted to the chambers 68, the two half-mandrels 63, 64 are guided exactly in parallel to one another, the bearing-cover-side half-mandrel 63 is tightly screwed to the two pistons 67. One of the two screwed connections is illustrated in FIG. 7 which shows the cross-section of the expanding mandrel 62. This figure also shows that the pistons or clamping strips 67 guided in the chambers 68 are each sealed off by means of an O-ring (not shown).

In contrast to the prior art known from the initially described U.S. Patent Document U.S. Pat. No. 4,754,906, in the device 57 according to the invention, the hydraulic chambers 68 in the support-side half-mandrel 64 are each equipped with pistons 67 which are arranged in them in a tightly and movably guided manner and which, as a result of their fixed connection (for example, screwed connection) with the bearing-cover-side half-mandrel 63, guide this half-mandrel in a straight line and operate it for the purpose of fracture separating. Thus, in the device 57, the pistons 67, which are arranged in a guided manner, form the combined operating/guiding linkage 66 which, together with the hydraulic chambers 68, including the expanding mandrel 62, forms the fracture separating device 61. In this embodiment, one piston rod is left out whose function is taken over by the respective piston 67.

The springs 69, which act as elastically flexible stops 65, are used for a restoring of the bearing-cover-side half-mandrel 63 relative to the support-side half-mandrel 64 for the easy axial introduction of the expanding mandrel 62 into the bearing bores of the bearing arrangements 59.

FIG. 6 also shows that the support-side half-mandrel 64 is arranged between adjacent bearing arrangements 59 while additionally interacting with supporting elements 70 of a securing frame 71. In each supporting element 70, the securing frame 71 has openings 72, which are widened in an oblong-hole-type manner and which catch the expanding mandrel 62 after the fracture separating of the bearing covers 60. For the rotational securing of the bearing covers 60, stops 73 are provided which can be displaced between the supporting elements 70 in the fracture-separating direction and which are each equipped with lockable tensioning elements 73' which grip a bearing cover 60 between its front faces in a tong-type manner. The securing frame 71 with the stops 73 is fixedly arranged on the stand side. For introducing the fracture separating force in the predetermined fracture-separating direction, the expanding mandrel 62 may be arranged in a rotationally secured manner relative to the crankcase 58 or to the stand which is not shown.

Within the framework of the invention, fracture separating devices which are equipped with lugs in the combined operating/guiding linkage can fracture separate the bearing covers of the bearing arrangements also by means of pressure forces, in which case these lugs act, for example, on the respective mandrel through the cylinder bores of a crankcase.

Furthermore, the invention can also be used for the common fracture separating of several bearing covers of correspondingly arranged connecting rods.

A separately vertically adjustable arrangement of a respective crankcase will not be necessary if the radius of the respective mandrel is clearly smaller than that of the respective bearing bore of the bearing arrangements, maximally up to 5%.

Also, the fracture separating device according to the invention can be used in any spatial position.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Device for fracture separating bearing covers of aligned bearing bores in bearing arrangements of a machine member, comprising:

a mandrel having an at least partially circular cross-section to be guided as a separating element axially in the bearing bores, an operating linkage operatively connected with the mandrel via a plurality of lugs having lug openings to be aligned with said bearing bores, said lug openings receiving said mandrel, said operating linkage being operatively connected with an energy accumulator to impart a fracture separating force on the bearing cover in a direction transverse to a longitudinal course of the mandrel via said lugs and said mandrel, the energy accumulator being a piston-cylinder unit with a piston rod forming a section of the operating linkage, the piston rod of the operating linkage being guided in a straight line on the cylinder side and being used for guiding the respective mandrel in a fracture separating direction, the respective mandrel being held in a rotationally secured manner and each bearing cover being rotationally secured while being clamped against the mandrel.

2. Device according to claim 1, wherein a piston of the piston-cylinder unit is initially hydraulically acted upon for a prestressing force of approximately 70 to 90% of the fracture separating force, the piston being subsequently acted upon in an intensified manner for causing an abruptly effective fracture separating force.

3. Device according to claim 1, wherein the operating linkage and the energy accumulator are arranged in a stand which is constructed with at least one receiving device used for a positioned arrangement of the respective machine member relative to the fracture separating device.

4. Device according to claim 3, wherein the stand with its receiving device is used for a support of a crankcase of a piston engine having bearing arrangements, said support supporting the fracture separating force, stops being provided on the lugs which engage the bearing covers to prevent rotation thereof.

5. Device according to claim 4, wherein the full mandrel is axially positioned by means of a stop, and is axially secured in position during fracture separating by means of a clamped holding of at least one bearing bore of the bearing arrangements.

6. Device according to claim 4, wherein the full mandrel, which is provided for fracture separating a predetermined number of bearing covers, has profiles in a bearing-cover-side circumferential area which are adapted to a time-varied fracture separating of predetermined bearing covers, the full mandrel being axially secured in position by means of clamping holding devices which operate in several bearing bores.

7. Device according to claim 3, wherein the stand is constructed with a receiving device for the crankcase, which receiving device is vertically adjustable relative to the respective fracture separating device, the vertical adjustment being controlled by way of an adjusting device serving to align the bearing arrangements of the crankcase with respect to the mandrel openings in at least one of the lugs and the supporting elements, for a non-clamping sliding-in of the mandrel.

8. Device according to claim 7, wherein the stand has receiving devices for the crankcase which are arranged to be movable transversely to the fracture separating direction.

9. Device according to claim 1, wherein said bearing covers comprise a bearing cover compound frame which includes several bearing covers.

10. Device according to claim 1, further comprising auxiliary screws with arranged in the bearing arrangements spaced away from the bearing covers with respect to a free flow of the fracture separating.

11. Apparatus for fracture separating a bearing cover from a component having a bearing arrangement defining a bearing bore, comprising:
- a pair of lugs to be arranged on mutually opposite sides of said bearing bore, each of said lugs defining a lug opening to be aligned with said bearing bore along an axis;
- a mandrel to be inserted axially through said lug openings and said bearing bore, said lugs and said mandrel being movable in a direction transverse to said axis;
- a receiving device engaging said component to prevent movement thereof at least in said transverse direction; and
- an energy accumulator operatively coupled to said pair of lugs to move said lugs and said mandrel in said transverse direction to fracture said bearing cover from said component.

12. Apparatus according to claim 11, further comprising mandrel holding means for holding the mandrel in a rotationally secure manner during said force fracture separation.

13. Apparatus according to claim 11, further comprising bearing cover holding means carried by the mandrel and serving to rotationally secure the bearing cover with respect to the mandrel during fracture separation movement of the bearing cover.

14. Apparatus for fracture separating a bearing cover from a component having at least one bearing arrangement defining at least one bearing bore, respectively, comprising:
- a plurality of lugs, each of said lugs defining a lug opening to be aligned with said at least one bearing bore along an axis;
- a mandrel to be inserted axially through said lug openings and said at least one bearing bore, said lugs and at least a portion of said mandrel being movable in a direction transverse to said axis;
- a receiving device which supports said component from movement at least in said transverse direction; and
- an energy accumulator operatively coupled to said lugs to move said lugs and said at least a portion of said mandrel in said transverse direction to fracture said bearing cover from said component.

15. Apparatus according to claim 14, further comprising mandrel holding means for holding the mandrel in a rotationally secure manner during said force fracture separation.

16. Apparatus according to claim 14, further comprising bearing cover holding means carried by the mandrel and serving to rotationally secure the bearing cover with respect to the mandrel during fracture separation movement of the bearing cover.

* * * * *